July 14, 1953  N. L. STEPHENSON  2,645,330
SAFETY CONTROL SYSTEM FOR MINES
Filed Sept. 12, 1950  2 Sheets-Sheet 1
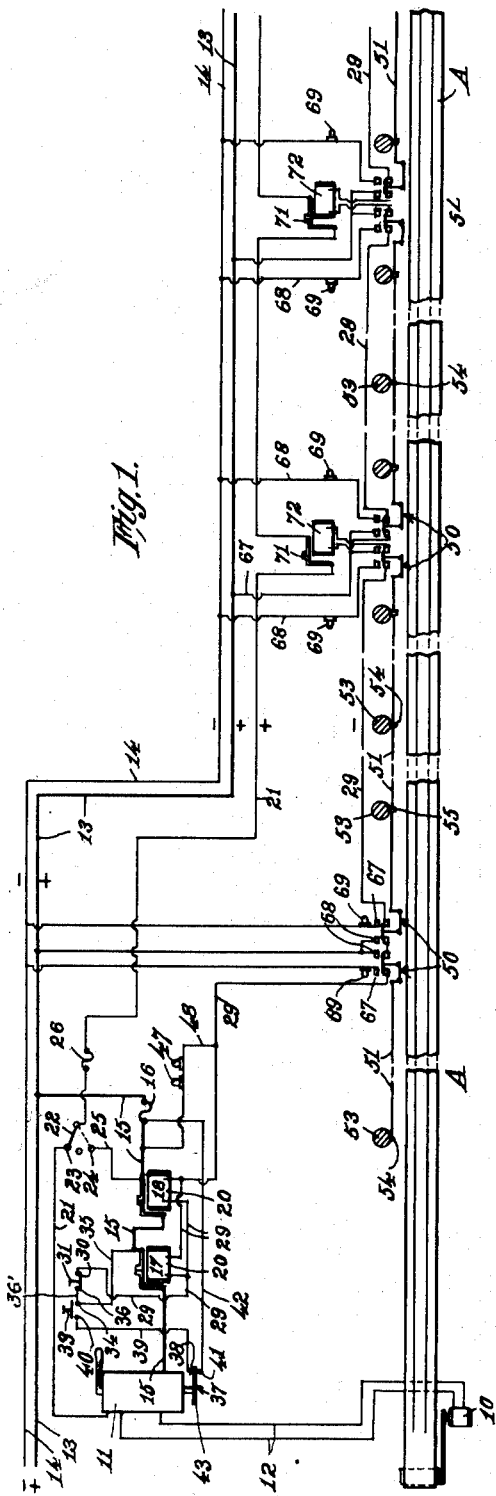
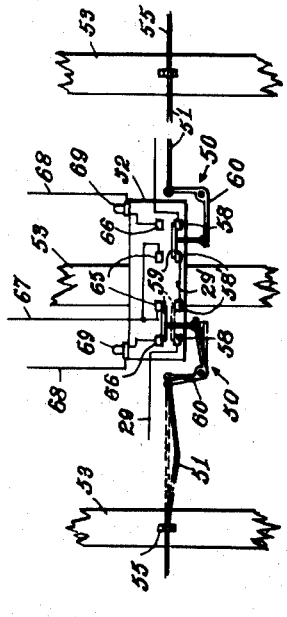
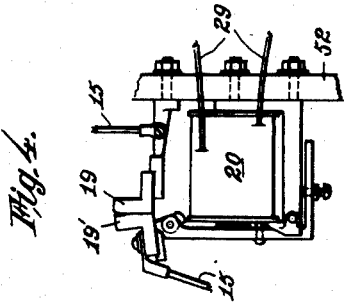
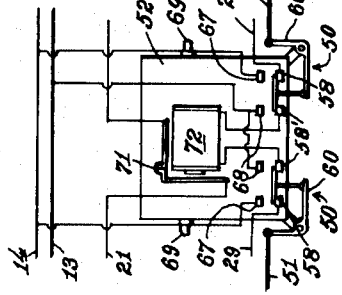
INVENTOR.
Noah L. Stephenson
BY
ATTORNEY

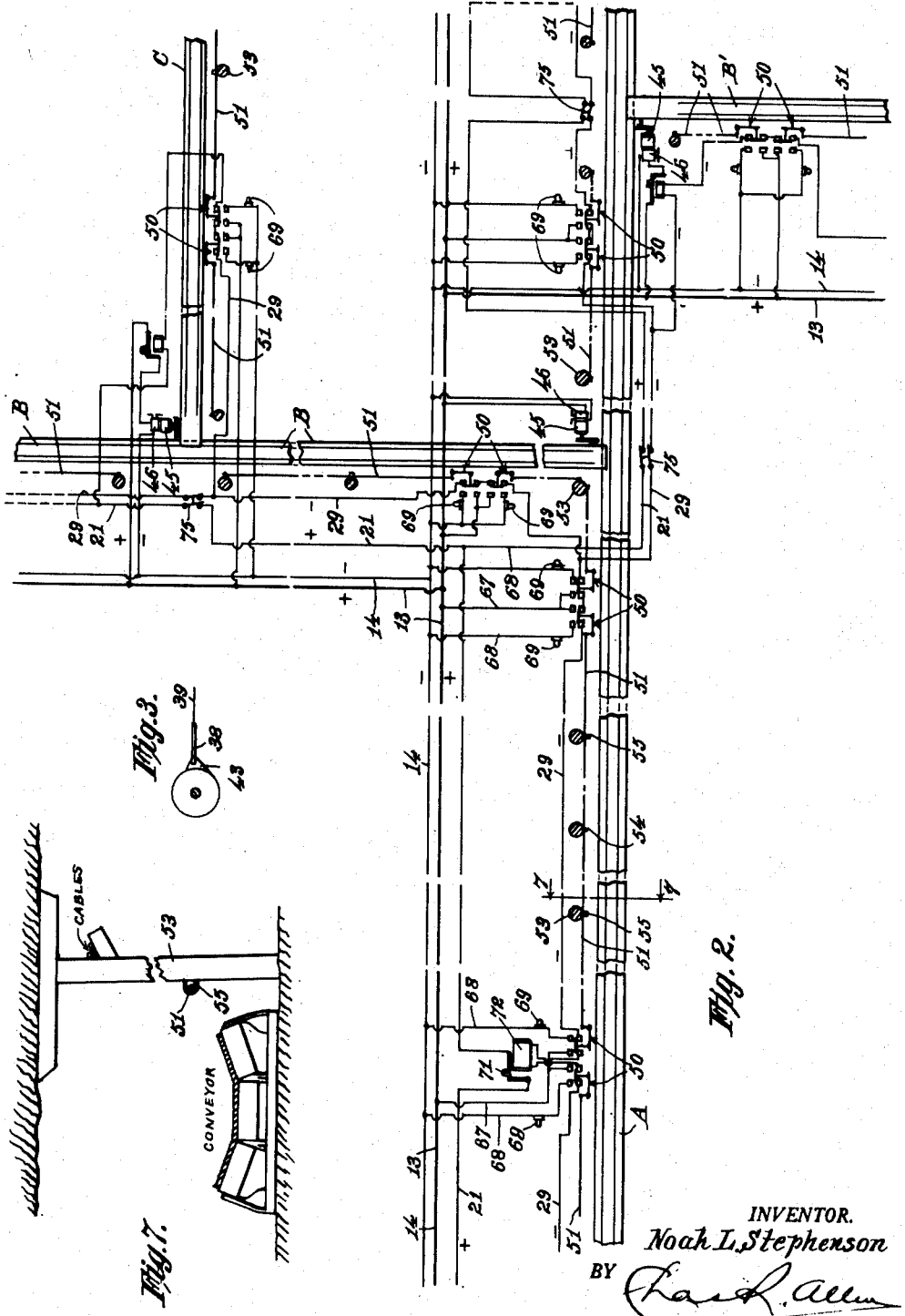

Patented July 14, 1953

2,645,330

UNITED STATES PATENT OFFICE 2,645,330

SAFETY CONTROL SYSTEM FOR MINES

Noah Lawrence Stephenson, Logan, W. Va., assignor of forty-five per cent to John B. Hughey, Logan, W. Va.

Application September 12, 1950, Serial No. 184,447

9 Claims. (Cl. 198—78)

This invention relates to a safety control system for mines equipped with belt conveyors; and specifically to a system whereby all of the conveyors of a mine section may be instantly and simultaneously stopped from any point along any of the conveyor lines, in case of an emergency.

The conveyor belts of a mine section comprises the "mother conveyor" extending along the main entry, cross entry feeder conveyors which deposit onto the mother conveyor, and branch or "room" conveyors which feed the mined coal onto the cross entry conveyors. These several conveyors are not only used for conveying the coal from the working areas, but are also employed for transporting men and materials to and from said areas.

The belts or conveyors are individually driven by motors, the circuits to all of which are controlled from a master controller, located in the main entry, when the system is operating to deliver coal from the working areas. However, a motor control mechanism is provided for each motor so that when the conveyor belts are used for carrying men and supplies into the working areas the operation of each individual belt may be independent of the master controller. When said motors are reversed in order to deliver from said areas, the individual motors are automatically re-connected to the master controller. As this component is not, per se, a part of the present invention, but constitutes a standard installation, detail illustration and description thereof is omitted to avoid unnecessary confusion.

When men are being conveyed to or from the working areas, they lie prone on the conveyor; and it is not unusual that conditions are detected by one of the men rendering it unsafe to continue onward. The conveyor is under the control of an operator adjacent the outer end of the conveyor; and after the gang is on the belt, the belt is moved rapidly forwardly toward the working area, which is usually at a considerable distance. While travelling at such speed, it would be disastrous and probably fatal, to a man or men on the belt to be forced against an obstruction, such as slate projecting from the end of one of the feeder conveyors, a timber fallen across the conveyor, or other dangerous conditions. At such times the man or men are too far from the operator to signal him to stop the conveyor, and the accident cannot be avoided.

The object of the present invention is to provide means whereby anyone travelling on the belt may instantly stop the belt upon sighting a dangerous condition.

A further object of the invention is to provide means for automatically displaying a preferably illuminated signal at the section where the trouble is located.

A further object of the invention is to provide a signal at the main controller board which will automatically indicate the presence of a dangerous condition somewhere along the conveyor system.

A further object of the invention is to provide an arrangement whereby the conveyors cannot again be started by the main controller, after having been stopped by the safety means, until after the emergency is cleared up and the master controller is moved to full "off" position, and then started in the usual manner.

Other objects will appear hereinafter.

With the above stated objects in view, the invention consists generally in a magnetic contactor arranged in the positive line to the master controller, a negative line extending substantially parallel with the conveyors, a plurality of normally closed switches in said negative line arranged at intervals along the same, a pullcord for each of said switches and arranged in linear alignment, said cords paralleling the conveyors and at all times within easy reach of every person on the conveyor and connected to said switches, the magnetic solenoid of said contactor being in series with said switches, whereby a pull on any one of said cords will open the adjacent switch and break the circuit to said solenoid, thereby breaking the main circuit through said contactor and to said controller.

The invention will be more readily understood by reference to the accompanying drawings, forming a part of this specification and in which Fig. 1 is a diagram of the master controller end of a conveyor system equipped with the safety control embodying the present invention;

Fig. 2 is a similar diagram of a continuation of the system shown in Fig. 1 and including feeder conveyors and a room conveyor;

Fig. 3 is a detail diagram of the safety contact device at the master controller;

Fig. 4 is a view of one of the several magnetically controlled contactors, illustrated upon a much enlarged scale;

Fig. 5 is a detail diagram of a pair of the emergency switches and operating means;

Fig. 6 is a similar view of a set of emergency switches and an associated contactor, and Fig. 7 is a detail cross section on the line 7—7 of Fig. 2.

Referring to the drawings, A indicates the mother conveyor, B and B' feeder conveyors extending laterally from conveyor A, and C a room conveyor which feeds onto conveyor B. While the drawings illustrate only two feeder conveyors, and one room conveyor, it is to be understood that in practice, there will be as many such conveyors as there are rooms to serve, and that the safety system comprising the present invention may be extended to each, as will be obvious as the description proceeds.

The mother conveyor A is driven by a motor 10 electrically connected to the master controller 11, preferably of the drum type, by conductors 12. The main positive line for the conveyor system is indicated at 13 and the main negative line at 14. These lines substantially parallel the several conveyors throughout their extent. A conductor 15 connects the controller 11 to the positive line 13 through a fuse 16 and a pair of magnetically actuated contactors 17 and 18 which are arranged in series. The contactor 18 constitutes an auxiliary contactor for the main contactor 17. It is not uncommon for a contactor to fuse and stick at the contact points, but I have found that by providing an auxiliary contactor in series with the main contactor, such fusion and sticking is eliminated.

Fig. 4 illustrates the preferred type of contactors to be used; but it is to be understood that the invention is not limited to such type, as other forms of magnetic contactors may be used without departing from the scope of this invention. As shown in said Fig. 4, 19 and 19' constitute the fixed and movable elements respectively, and 20 the solenoid for magnetically actuating the contact 19'. The contacts 19 and 19' of the two contactors are interposed in series in the line 15; and the solenoids 20 are in parallel in a negative line as will be fully described hereinafter.

Extending from the controller 11 is a positive line 21 which parallels the several conveyors, and also the main circuit lines 13—14. Interposed in the line 21 is a single pole double throw switch 22, having contacts 23 and 24, the former being connected to the controller 11 and the latter being connected to the conductor 15 of the contactors by a line 25. When the switch 22 engages the contact 23 the entire conveyor system is under the control of the controller 11; but when said switch engages the contact 24 the several feeder and room conveyors may be individually operated to carry in and out supplies and other material. When the switch is in neutral position, only the mother conveyor can be operated. This is particularly important especially when taking in men and material as will be more fully described hereinafter. A fuse 26 is preferably provided in the line 21.

A negative line 29 parallels the positive line 21 and is connected in parallel through the solenoids 20 of the respective contactors 17 and 18, to a contact 30 of an emergency switch 31, said switch being preferably of the push button type.

A starter switch 33, also of the push button type, has one contact 34 thereof connected to the positive conductor 15 as by a conductor 35; and the contact 36 of the emergency switch is also connected to said conductor 15 through a connection 36' extending between the contacts 36 and 34 of the respective switches.

Should the operator fail to shut off the controller after the conveyors have been stopped by the safety system, it is necessary that he cannot start the conveyors until after the emergency has been cleared up and he has moved the controller to full "off" position and then closed the starter switch 33. To this end a safety switch 37 is provided at the drum controller 11. This comprises a contact 38 connected by line 39 to contact 40 of the starter switch 33, a contact 41 connected by line 42 to the positive line 15 between the fuse 16 and contactor 18, and a movable contact 43 on the shaft of the controller 11. The contact 43 is arranged so as to close the circuit 39—42 only when the controller is in fully "off" position. The operation of this portion of the device will appear more fully hereinafter.

Each of the feeder belts B and the room belts C are provided with a motor 45; and each motor is equipped with a controller 46 connected directly to the main power lines 13 and 14.

When the impelling current to the motors of the conveyor system is suddenly stopped, the inertia of the conveyors and superposed loads continues to move the conveyors and the armatures of the motor for a few seconds, thus producing a reverse current back through the controlling system, which causes the contactors to fly into and out of contact. To avoid this phenomenon a pair of neon light bulbs 47 are provided in a shunt 48 extending between the negative line 29 and the positive line 15, to which it is connected at a point between the fuse 16 and contactor 18. The light bulbs 47 are arranged on the main control panel (not illustrated) and are constantly lit when the entire system is clear and in normal operative condition.

As hereinbefore stated, the positive line 21 and negative line 29 parallel the several belts; and interposed at spaced intervals in the negative line 29 are circuit breakers 50 actuated by pullcords 51 laterally spaced from an adjacent edge of the belts and within easy reach at all times of any and all of the persons being transported on the belt or belts.

The circuit breakers 50 are preferably arranged in pairs, and mounted on panels 52 located approximately six-hundred feet part, and fixed upon roof supporting timbers 53. However, it is to be understood that the distances between the pairs of circuit breakers may be varied as found desirable. This arrangement divides the conveyor system into a plurality of sequential sections, each provided with a circuit breaker, a pull-cord, and other related elements, as will appear as the description proceeds.

The ends of the pull-cords 51 remote from the circuit breakers are fixedly secured to one of the timbers 53, as at 54. Between the fixed end 54 and the circuit breakers, the cords are slidably supported by guides 55 fixed to the intermediate timbers. The ends of the adjacent cords are secured at the same position, 54, and the cords adjacent each conveyor belt are all in linear sequence, so that they are at all points within easy reach of the personnel traveling on the conveyor; and it is evident that the circuit breakers may be quickly operated by any transverse displacement of any portion of any cord, either by push or pull, thereby being quickly responsive to any appreciable contact with the cord.

Fig. 5 illustrates a pair of circuit breakers mounted on a panel 52. Each circuit breaker comprises a pair of spaced fixed contacts 58 and 58' interposed in the negative line 29, a movable bar 59 normally engaging said contacts to complete the circuit, and a bell-crank lever 60 actuated by the pull cord 51 for unseating the bar 59 and breaking the circuit. It is obvious that a pull on the cord 51 will unseat the bar 59, thereby deenergizing the solenoids 20 and breaking the main circuit through the contactors 17 and 18 to the controller 11, and hence to the several motors 45.

Associated with each of the circuit breakers above described, is a pair of contacts 65 and 66, connected respectively to the main positive and negative lines 13 and 14 by lines 67 and 68, and a neon light 69 is provided in the negative line 68. The contacts 65 and 66 are spaced a short distance from the contacts 58—58', so that when the bell-crank lever disengages the contact 59 from the fixed contacts 58, it will move the same into engagement with the contacts 65 and 68, energizing the light 69 and thereby indicating the section in which the emergency is located.

The pairs of switches such as above described and as illustrated in Fig. 5, are located adjacent the loading stations, that is, at or near the control ends of the several belts; and in this form the adjacent contacts 58' of the two circuit breakers are connected by a short conductor 29'.

At the other locations along the line the same circuit breakers and circuit makers are provided as above described, except that a magnetically actuated contactor 71 is interposed in the positive line 21, and the solenoids 72 thereof are connected across contacts 58', replacing the conductor 29'.

A manually operable, single throw double pole switch 75 is provided in the lines 21 and 29 at each loading station which is at the power end of each of the feeder and room belts. An operator is stationed at these points when supplies and/or men are being loaded onto the feeder line heads. Timbers and other supplies are tossed across the mother line onto the feeder conveyors while the mother conveyor is in operation; and should a timber or other material become fouled, the operator would pull the switch 75 and stop every conveyor without taking time to cross the mother belt to reach the switch on the starter 46.

The operation of the device is as follows:

Assuming that a person or persons are being transported on the conveyor A, and that a dangerous condition is sighted ahead, the person seeing the trouble could reach out and pull or push the cord 51. This would immediately open the negative line 29 and deenergize the solenoids 20 of the contactors 17 and 18, whereupon contacts 19 and 19' in the main positive circuit to the control 11 and motor 10 will open and stop all of the motors throughout the system, if the switch 22 is in engagement with the contact 23. If the switch 22 is in engagement with the contact 24, the feeder and room conveyors will not be affected, but merely the mother conveyor. Should the trouble be along the feeder or room conveyors, while the whole system is under the control of the master controller, a pull on the adjacent cord 51 will stop the entire system. But if the switch 22 is thrown to disconnect the feeder and room conveyors from the main controller 11, only the motor of the particular conveyor will be stopped.

Whenever a circuit breaker 50 is actuated, the circuit to the lamp 69 in the co-related section of the system will be closed, thereby visually indicating the location of the trouble. At the same time the neon lamps 47 at the main control will be extinguished.

After the system has been stopped, as above described, it will be impossible for the operator at the main control to again start the motors until the solenoids 20 of the contactors 17 and 18 are energized. It is for this purpose that the safety switch is provided on the master controller 11. This safety switch is located in the circuit to the solenoids 20, and is only closed when the controller 11 is in full "off" position. Hence, should the operator overlook shutting off the controller when the motor was stopped by the safety means, he could not again start the same until the controller is moved to "off" position, thereby closing the emergency switch 37—38—41, and then pressing the starter button 33 to complete the circuit through the solenoids 20.

When the emergency is cleared up, the contact 59 of the actuated circuit breaker is again brought into engagement with the contacts 58—58', closing the circuit through the neon lights 47 at the main control, and thereby advising the operator that the trouble has been cleared up. It is obvious that, by manipulating said circuit breaker, at the point of trouble, the lights 47 may be flickered to convey a signal to the operator, a code of signals having been provided. This is an important feature, as the operator could thereby be informed when an injured person is to be moved out, and the belt should be operated slowly in reverse direction.

It is obvious to anyone skilled in the art that this system of control applies to both alternating current and direct current installations.

1. In a mine safety system, a conveyor, a motor for said conveyor, a controller for said motor, a positive power line to said controller, a contactor interposed in said power line, a solenoid for actuating said contactor, a negative line extending parallel with said conveyor, a normally closed circuit breaker in said negative line, said solenoid being arranged in series with said circuit breaker, and a pull cord paralleling said conveyor and at all points within easy reach of a person on said conveyor, and means operable by transverse displacement of any portion of said cord for opening said circuit breaker.

2. In a mine safety system, a conveyor, a motor for said conveyor, a drum controller for said motor, main positive and negative lines, a conductor from said positive line to said controller, a magnetic contactor interposed in the last said conductor, a two point emergency switch, a second negative line paralleling said conveyor and connected to one point of said emergency switch, the magnet of said contactor being interposed in the last said negative line, a conductor connecting the second point of said emergency switch to the positive line leading to said contactor, circuit breakers arranged at frequent intervals and in series in the second negative line, and means paralleling said conveyor and within reach of a person on said conveyor, for actuating the nearest circuit breakers to open the line.

3. In a mine safety system, a conveyor, a motor for said conveyor, a drum master controller for said motor, main positive and negative lines, a conductor from said positive line to said controller, a magnetic contactor interposed in the last said conductor, a two point emergency switch, a second negative line paralleling said conveyor and connected to one point of said emergency switch, the magnet of said contactor being interposed in the last said negative line, a conductor connecting the second point of said emergency switch to the positive line leading to said contactor, a conductor leading from said second point of the emergency switch to the positive line leading to said contactor, a safety switch interposed in the last said conductor and comprising a pair of spaced contact points adjacent said controller and a circuit closing contact fixed to the motor of said controller and closing the circuit through said points only when said controller is in "off" position, a plurality of circuit breakers interposed in series and at frequent intervals in said second negative line, and means paralleling said conveyor and within reach of a person on said conveyor, for actuating adjacent circuit breakers to open said second negative line and thereby breaking the circuit to said controller and said conttactor and said master controller.

4. In a mine safety system, a conveyor, a motor for said conveyor, a controller for said motor, a positive line to said controller, a magnetic contactor interposed in said line, in combination with a negative line paralleling said conveyor, the solenoid of said magnetic contactor being interposed in said negative line, and a plurality of circuit breakers interposed at frequent intervals in said negative line, each of said circuit breakers comprising a pair of fixed contacts and a movable contact normally bridging said fixed contacts, and a bell-crank lever for displacing said movable contact, and pull-cords paralleling said conveyor for actuating said levers.

5. In a mine safety system, a mother conveyor, and a plurality of feeder conveyors, a motor for said mother conveyor, an auxiliary motor for each of said feeder conveyors, a main positive line and a main negative line paralleling said conveyors, a main controller, and an auxiliary controller for each of the auxiliary motors, a conductor from the main positive line to said main controller, a magnetic contactor interposed in said conductor and including the usual solenoid, a second positive line extending from said main controller and connected to each of said auxiliary controllers, a single pole double throw switch interposed in said second positive line adjacent said main controller, one contact of said switch being connected to said main controller and the other contact being connected to said line to the magnetic contactor, a second negative line extending from said controller and paralleling said conveyors, the solenoid of said magnetic contactor being interposed therein, a plurality of circuit breakers interposed in said second negative line, and means paralleling each of said conveyors and within easy reach of a person on said conveyor for actuating an adjacent circuit breaker.

6. In a mine safety system, a mother conveyor, and a plurality of feeder conveyors, a motor for said mother conveyor, an auxiliary motor for each of said feeder conveyors, a main positive line and a main negative line paralleling said conveyors, a main controller and an auxiliary controller for each of said auxiliary motors, a conductor from the main positive line to said main controller, a magnetic contactor interposed in said conductor and including the usual solenoid, a second positive line extending from said main controller and connected to each of said auxiliary controllers, a single pole double throw switch interposed in said positive line adjacent said main controller, one contact of said switch being connected to said main controller and the other contact being connected to said line to the magnetic contactor, a second negative line extending from said controller and paralleling said conveyors, the solenoid of said magnetic contactor being interposed therein, a normally closed emergency switch and a normally open starting switch located adjacent said main controller, and each of said switches preferably being of the two point make and break type, one point of each of said switches being connected in parallel to the main positive line to the main contactor, the other point of the safety switch being connected to the negative line leading from the solenoid of the magnetic contactor, a controller safety switch comprising a pair of contacts and a circuit closing arm on the controller adapted to engage said contacts only when the controller is in fully "off" position, one of said contacts being connected to said starter switch and the other contact of the safety switch being connected to the main positive line, a plurality of circuit breakers interposed in said second negative line, and means paralleling each of said conveyors and within easy reach of a person on said conveyor for actuating an adjacent circuit breaker.

7. In a mine safety system, a conveyor, a motor for said conveyor, a controller for said motor, main positive and negative lines, a conductor from said main positive line to said controller, a magnetic contactor in said conductor, a second negative line paralleling said conveyor, the solenoid of said contactor being interposed in said second negative line, a series of interlocking switches arranged at frequent intervals along said negative line and each comprising a pair of contacts in said second negative line, a second pair of similar contacts spaced from the first said contacts, the said second pair of contacts being shunted across said main lines, a circuit closer normally bridging the contacts in said negative line, and a pull-cord paralleling said conveyor and within reach of a person thereon, and means actuated by transverse displacement of any one of said cords for moving said circuit closer out of engagement with the first said pair of contacts and into engagement with the second pair of contacts.

8. A mine safety system as set forth in claim 7 further characterized by a lamp interposed in each of the shunt lines from the second pair of contacts to said main line.

9. A mine safety system as set forth in claim 7, further characterized by a pair of neon lights shunted across the positive line to the magnetic contactor and said second negative line, and a lamp interposed in the shunt line from the second pair of contacts of the interlocking switches to the main line.

NOAH LAWRENCE STEPHENSON.

References Cited in the file of this patent

UNITED STATES PATENTS

| Number | Name | Date |
|---|---|---|
| 2,277,578 | Booth | Mar. 24, 1942 |
| 2,372,130 | Smith | Mar. 20, 1945 |
| 2,472,526 | Frazee | June 7, 1949 |
| 2,495,249 | Gilbert | June 24, 1950 |
| 2,534,110 | Dice et al. | Dec. 12, 1950 |